(12) United States Patent
Hatakeyama

(10) Patent No.: US 6,522,704 B1
(45) Date of Patent: Feb. 18, 2003

(54) DATA RECEPTION APPARATUS AND DATA RECEPTION METHOD

(75) Inventor: Izumi Hatakeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/478,414

(22) Filed: Jan. 6, 2000

(30) Foreign Application Priority Data

Jan. 7, 1999 (JP) .............................. 11-002056

(51) Int. Cl.[7] .................... H04L 27/06; H04B 7/216
(52) U.S. Cl. ........................ 375/340; 370/342
(58) Field of Search ..................... 375/340, 130, 375/342, 147, 324, 316, 222, 341; 370/342, 335, 320

(56) References Cited

U.S. PATENT DOCUMENTS 5,901,186 A * 5/1999 Jamal et al. ............... 375/346
6,324,209 B1 * 11/2001 Li et al. .................... 375/140

* cited by examiner

Primary Examiner—Chi Pham
Assistant Examiner—Khai Tran
(74) Attorney, Agent, or Firm—Jay H. Maioli

(57) ABSTRACT

Data D28 of 384 symbols each (fundamental data) corresponding to a transmission rate on a communication line is sequentially obtained by de-interleaving received data. A de-repetition circuit 212 sequentially outputs four kinds of data D29 to D32 of 384 symbols, 192 symbols, 96 symbols and 48 symbols, including data transfer rates of approximately 9600 bps, approximately 4800 bps, approximately 2400 bps and approximately 1200 bps in response to the data D28 of 384 symbols each. In that case, the data D28 is outputted as the data D29 as it is. At that very moment, a hold circuit 222 and an adder 223 are used to generate data whose data amount is ½ times the data amount from the data D28 as the next outputted data D30, and the data thus generated is written in a memory 213. When data D30, D31 are also outputted, data D31, D32 are respectively generated in the same way. Thus, it is sufficient that the received data of 384 symbols each might be de-interleaved once.

6 Claims, 12 Drawing Sheets

F I G. 4

| LINE TRANSFER RATE | DATA TRANSFER RATE | NUMBER OF REPETITIONS | CONVOLUTIONAL CODING RATE | CODE ADDING DATA AMOUNT/20msec | ORIGINAL DATA | CRC | TAIL BIT |
|---|---|---|---|---|---|---|---|
| 19200bps (384bit/20ms) | 9600bps | 0 | 1/2 | 192bit | 172bit | 12bit | 8bit |
| | 4800bps | 1 | | 96bit | 80bit | 8bit | |
| | 2400bps | 3 | | 48bit | 40bit | ---- | |
| | 1200bps | 7 | | 24bit | 16bit | ---- | |

FIG. 5

| 1 | 9 | 5 | 13 | 3 | 11 | 7 | 15 | 2 | 10 | 6 | 14 | 4 | 12 | 8 | 16 |
|---|---|---|---|---|---|---|---|---|---|---|---|---|---|---|---|
| 65 | 73 | 69 | 77 | 67 | 75 | 71 | 79 | 66 | 74 | 70 | 78 | 68 | 76 | 72 | 80 |
| 129 | 137 | 133 | 141 | 131 | 139 | 135 | 143 | 130 | 138 | 134 | 142 | 132 | 140 | 136 | 144 |
| 193 | 201 | 197 | 205 | 195 | 203 | 199 | 207 | 194 | 202 | 198 | 206 | 196 | 204 | 200 | 208 |
| 257 | 265 | 261 | 269 | 259 | 267 | 263 | 271 | 258 | 266 | 262 | 270 | 260 | 268 | 264 | 272 |
| 321 | 329 | 325 | 333 | 323 | 331 | 327 | 335 | 322 | 330 | 326 | 334 | 324 | 332 | 328 | 336 |
| 33 | 41 | 37 | 45 | 35 | 43 | 39 | 47 | 34 | 42 | 38 | 46 | 36 | 44 | 40 | 48 |
| 97 | 105 | 101 | 109 | 99 | 107 | 103 | 111 | 98 | 106 | 102 | 110 | 100 | 108 | 104 | 112 |
| 161 | 169 | 165 | 173 | 163 | 171 | 167 | 175 | 162 | 170 | 166 | 174 | 164 | 172 | 168 | 176 |
| 225 | 233 | 229 | 237 | 227 | 235 | 231 | 239 | 226 | 234 | 230 | 238 | 228 | 236 | 232 | 240 |
| 289 | 297 | 293 | 301 | 291 | 299 | 295 | 303 | 290 | 298 | 294 | 302 | 292 | 300 | 296 | 304 |
| 353 | 361 | 357 | 365 | 355 | 363 | 359 | 367 | 354 | 362 | 358 | 366 | 356 | 364 | 360 | 368 |
| 17 | 25 | 21 | 29 | 19 | 27 | 23 | 31 | 18 | 26 | 22 | 30 | 20 | 28 | 24 | 32 |
| 81 | 89 | 85 | 93 | 83 | 91 | 87 | 95 | 82 | 90 | 86 | 94 | 84 | 92 | 88 | 96 |
| 145 | 153 | 149 | 157 | 147 | 155 | 151 | 159 | 146 | 154 | 150 | 158 | 148 | 156 | 152 | 160 |
| 209 | 217 | 213 | 221 | 211 | 219 | 215 | 223 | 210 | 218 | 214 | 222 | 212 | 220 | 216 | 224 |
| 273 | 281 | 277 | 285 | 275 | 283 | 279 | 287 | 274 | 282 | 278 | 286 | 276 | 284 | 280 | 288 |
| 337 | 345 | 341 | 349 | 339 | 347 | 343 | 351 | 338 | 346 | 342 | 350 | 340 | 348 | 344 | 352 |
| 49 | 57 | 53 | 61 | 51 | 59 | 55 | 63 | 50 | 58 | 54 | 62 | 52 | 60 | 56 | 64 |
| 113 | 121 | 117 | 125 | 115 | 123 | 119 | 127 | 114 | 122 | 118 | 126 | 116 | 124 | 120 | 128 |
| 177 | 185 | 181 | 189 | 179 | 187 | 183 | 191 | 178 | 186 | 182 | 190 | 180 | 188 | 184 | 192 |
| 241 | 249 | 245 | 253 | 243 | 251 | 247 | 255 | 242 | 250 | 246 | 254 | 244 | 252 | 248 | 256 |
| 305 | 313 | 309 | 317 | 307 | 315 | 311 | 319 | 306 | 314 | 310 | 318 | 308 | 316 | 312 | 320 |
| 369 | 377 | 373 | 381 | 371 | 379 | 375 | 383 | 370 | 378 | 374 | 382 | 372 | 380 | 376 | 384 |

READ DIRECTION →

FIG. 6

| | | | | | | | | | | | | | | | |
|---|---|---|---|---|---|---|---|---|---|---|---|---|---|---|---|
| 1 | 5 | 3 | 7 | 2 | 6 | 4 | 8 | 1 | 5 | 3 | 7 | 2 | 6 | 4 | 8 |
| 33 | 37 | 35 | 39 | 34 | 38 | 36 | 40 | 33 | 37 | 35 | 39 | 34 | 38 | 36 | 40 |
| 65 | 69 | 67 | 71 | 66 | 70 | 68 | 72 | 65 | 69 | 67 | 71 | 66 | 70 | 68 | 72 |
| 97 | 101 | 99 | 103 | 98 | 102 | 100 | 104 | 97 | 101 | 99 | 103 | 98 | 102 | 100 | 104 |
| 129 | 133 | 131 | 135 | 130 | 134 | 132 | 136 | 129 | 133 | 131 | 135 | 130 | 134 | 132 | 136 |
| 161 | 165 | 163 | 167 | 162 | 166 | 164 | 168 | 161 | 165 | 163 | 167 | 162 | 166 | 164 | 168 |
| 17 | 21 | 19 | 23 | 18 | 22 | 20 | 24 | 17 | 21 | 19 | 23 | 18 | 22 | 20 | 24 |
| 49 | 53 | 51 | 55 | 50 | 54 | 52 | 56 | 49 | 53 | 51 | 55 | 50 | 54 | 52 | 56 |
| 81 | 85 | 83 | 87 | 82 | 86 | 84 | 88 | 81 | 85 | 83 | 87 | 82 | 86 | 84 | 88 |
| 113 | 117 | 115 | 119 | 114 | 118 | 116 | 120 | 113 | 117 | 115 | 119 | 114 | 118 | 116 | 120 |
| 145 | 149 | 147 | 151 | 146 | 150 | 148 | 152 | 145 | 149 | 147 | 151 | 146 | 150 | 148 | 152 |
| 177 | 181 | 179 | 183 | 178 | 182 | 180 | 184 | 177 | 181 | 179 | 183 | 178 | 182 | 180 | 184 |
| 9 | 13 | 11 | 15 | 10 | 14 | 12 | 16 | 9 | 13 | 11 | 15 | 10 | 14 | 12 | 16 |
| 41 | 45 | 43 | 47 | 42 | 46 | 44 | 48 | 41 | 45 | 43 | 47 | 42 | 46 | 44 | 48 |
| 73 | 77 | 75 | 79 | 74 | 78 | 76 | 80 | 73 | 77 | 75 | 79 | 74 | 78 | 76 | 80 |
| 105 | 109 | 107 | 111 | 106 | 110 | 108 | 112 | 105 | 109 | 107 | 111 | 106 | 110 | 108 | 112 |
| 137 | 141 | 139 | 143 | 138 | 142 | 140 | 144 | 137 | 141 | 139 | 143 | 138 | 142 | 140 | 144 |
| 169 | 173 | 171 | 175 | 170 | 174 | 172 | 176 | 169 | 173 | 171 | 175 | 170 | 174 | 172 | 176 |
| 25 | 29 | 27 | 31 | 26 | 30 | 28 | 32 | 25 | 29 | 27 | 31 | 26 | 30 | 28 | 32 |
| 57 | 61 | 59 | 63 | 58 | 62 | 60 | 64 | 57 | 61 | 59 | 63 | 58 | 62 | 60 | 64 |
| 89 | 93 | 91 | 95 | 90 | 94 | 92 | 96 | 89 | 93 | 91 | 95 | 90 | 94 | 92 | 96 |
| 121 | 125 | 123 | 127 | 122 | 126 | 124 | 128 | 121 | 125 | 123 | 127 | 122 | 126 | 124 | 128 |
| 153 | 157 | 155 | 159 | 154 | 158 | 156 | 160 | 153 | 157 | 155 | 159 | 154 | 158 | 156 | 160 |
| 185 | 189 | 187 | 191 | 186 | 190 | 188 | 192 | 185 | 189 | 187 | 191 | 186 | 190 | 188 | 192 |

READ DIRECTION →

FIG. 7

|   |   |   |   |   |   |   |   |   |   |   |   |   |   |   |   |
|---|---|---|---|---|---|---|---|---|---|---|---|---|---|---|---|
| 4 | 20 | 36 | 52 | 68 | 84 | 12 | 28 | 44 | 60 | 76 | 92 | 8 | 24 | 40 | 56 | 72 | 88 | 16 | 32 | 48 | 64 | 80 | 96 |
| 2 | 18 | 34 | 50 | 66 | 82 | 10 | 26 | 42 | 58 | 74 | 90 | 6 | 22 | 38 | 54 | 70 | 86 | 14 | 30 | 46 | 62 | 78 | 94 |
| 3 | 19 | 35 | 51 | 67 | 83 | 11 | 27 | 43 | 59 | 75 | 91 | 7 | 23 | 39 | 55 | 71 | 87 | 15 | 31 | 47 | 63 | 79 | 95 |
| 1 | 17 | 33 | 49 | 65 | 81 | 9 | 25 | 41 | 57 | 73 | 89 | 5 | 21 | 37 | 53 | 69 | 85 | 13 | 29 | 45 | 61 | 77 | 93 |
| 4 | 20 | 36 | 52 | 68 | 84 | 12 | 28 | 44 | 60 | 76 | 92 | 8 | 24 | 40 | 56 | 72 | 88 | 16 | 32 | 48 | 64 | 80 | 96 |
| 2 | 18 | 34 | 50 | 66 | 82 | 10 | 26 | 42 | 58 | 74 | 90 | 6 | 22 | 38 | 54 | 70 | 86 | 14 | 30 | 46 | 62 | 78 | 94 |
| 3 | 19 | 35 | 51 | 67 | 83 | 11 | 27 | 43 | 59 | 75 | 91 | 7 | 23 | 39 | 55 | 71 | 87 | 15 | 31 | 47 | 63 | 79 | 95 |
| 1 | 17 | 33 | 49 | 65 | 81 | 9 | 25 | 41 | 57 | 73 | 89 | 5 | 21 | 37 | 53 | 69 | 85 | 13 | 29 | 45 | 61 | 77 | 93 |
| 4 | 20 | 36 | 52 | 68 | 84 | 12 | 28 | 44 | 60 | 76 | 92 | 8 | 24 | 40 | 56 | 72 | 88 | 16 | 32 | 48 | 64 | 80 | 96 |
| 2 | 18 | 34 | 50 | 66 | 82 | 10 | 26 | 42 | 58 | 74 | 90 | 6 | 22 | 38 | 54 | 70 | 86 | 14 | 30 | 46 | 62 | 78 | 94 |
| 3 | 19 | 35 | 51 | 67 | 83 | 11 | 27 | 43 | 59 | 75 | 91 | 7 | 23 | 39 | 55 | 71 | 87 | 15 | 31 | 47 | 63 | 79 | 95 |
| 1 | 17 | 33 | 49 | 65 | 81 | 9 | 25 | 41 | 57 | 73 | 89 | 5 | 21 | 37 | 53 | 69 | 85 | 13 | 29 | 45 | 61 | 77 | 93 |
| 4 | 20 | 36 | 52 | 68 | 84 | 12 | 28 | 44 | 60 | 76 | 92 | 8 | 24 | 40 | 56 | 72 | 88 | 16 | 32 | 48 | 64 | 80 | 96 |
| 2 | 18 | 34 | 50 | 66 | 82 | 10 | 26 | 42 | 58 | 74 | 90 | 6 | 22 | 38 | 54 | 70 | 86 | 14 | 30 | 46 | 62 | 78 | 94 |
| 3 | 19 | 35 | 51 | 67 | 83 | 11 | 27 | 43 | 59 | 75 | 91 | 7 | 23 | 39 | 55 | 71 | 87 | 15 | 31 | 47 | 63 | 79 | 95 |
| 1 | 17 | 33 | 49 | 65 | 81 | 9 | 25 | 41 | 57 | 73 | 89 | 5 | 21 | 37 | 53 | 69 | 85 | 13 | 29 | 45 | 61 | 77 | 93 |

READ DIRECTION →

FIG. 8

| 2 | 1 | 2 | 1 | 2 | 1 | 2 | 1 | 2 | 1 | 2 | 1 | 2 | 1 | 2 | 1 |
|---|---|---|---|---|---|---|---|---|---|---|---|---|---|---|---|
| 10 | 9 | 10 | 9 | 10 | 9 | 10 | 9 | 10 | 9 | 10 | 9 | 10 | 9 | 10 | 9 |
| 18 | 17 | 18 | 17 | 18 | 17 | 18 | 17 | 18 | 17 | 18 | 17 | 18 | 17 | 18 | 17 |
| 26 | 25 | 26 | 25 | 26 | 25 | 26 | 25 | 26 | 25 | 26 | 25 | 26 | 25 | 26 | 25 |
| 34 | 33 | 34 | 33 | 34 | 33 | 34 | 33 | 34 | 33 | 34 | 33 | 34 | 33 | 34 | 33 |
| 42 | 41 | 42 | 41 | 42 | 41 | 42 | 41 | 42 | 41 | 42 | 41 | 42 | 41 | 42 | 41 |
| 6 | 5 | 6 | 5 | 6 | 5 | 6 | 5 | 6 | 5 | 6 | 5 | 6 | 5 | 6 | 5 |
| 14 | 13 | 14 | 13 | 14 | 13 | 14 | 13 | 14 | 13 | 14 | 13 | 14 | 13 | 14 | 13 |
| 22 | 21 | 22 | 21 | 22 | 21 | 22 | 21 | 22 | 21 | 22 | 21 | 22 | 21 | 22 | 21 |
| 30 | 29 | 30 | 29 | 30 | 29 | 30 | 29 | 30 | 29 | 30 | 29 | 30 | 29 | 30 | 29 |
| 38 | 37 | 38 | 37 | 38 | 37 | 38 | 37 | 38 | 37 | 38 | 37 | 38 | 37 | 38 | 37 |
| 46 | 45 | 46 | 45 | 46 | 45 | 46 | 45 | 46 | 45 | 46 | 45 | 46 | 45 | 46 | 45 |
| 4 | 3 | 4 | 3 | 4 | 3 | 4 | 3 | 4 | 3 | 4 | 3 | 4 | 3 | 4 | 3 |
| 12 | 11 | 12 | 11 | 12 | 11 | 12 | 11 | 12 | 11 | 12 | 11 | 12 | 11 | 12 | 11 |
| 20 | 19 | 20 | 19 | 20 | 19 | 20 | 19 | 20 | 19 | 20 | 19 | 20 | 19 | 20 | 19 |
| 28 | 27 | 28 | 27 | 28 | 27 | 28 | 27 | 28 | 27 | 28 | 27 | 28 | 27 | 28 | 27 |
| 36 | 35 | 36 | 35 | 36 | 35 | 36 | 35 | 36 | 35 | 36 | 35 | 36 | 35 | 36 | 35 |
| 44 | 43 | 44 | 43 | 44 | 43 | 44 | 43 | 44 | 43 | 44 | 43 | 44 | 43 | 44 | 43 |
| 8 | 7 | 8 | 7 | 8 | 7 | 8 | 7 | 8 | 7 | 8 | 7 | 8 | 7 | 8 | 7 |
| 16 | 15 | 16 | 15 | 16 | 15 | 16 | 15 | 16 | 15 | 16 | 15 | 16 | 15 | 16 | 15 |
| 24 | 23 | 24 | 23 | 24 | 23 | 24 | 23 | 24 | 23 | 24 | 23 | 24 | 23 | 24 | 23 |
| 32 | 31 | 32 | 31 | 32 | 31 | 32 | 31 | 32 | 31 | 32 | 31 | 32 | 31 | 32 | 31 |
| 40 | 39 | 40 | 39 | 40 | 39 | 40 | 39 | 40 | 39 | 40 | 39 | 40 | 39 | 40 | 39 |
| 48 | 47 | 48 | 47 | 48 | 47 | 48 | 47 | 48 | 47 | 48 | 47 | 48 | 47 | 48 | 47 |

READ DIRECTION →

FIG. 10

| bit3 bit2 bit1 bit0 | POLARITY | RELIABILITY |
|---|---|---|
| 0   1   1   1 | 0 | High |
| 0   1   1   0 | 0 |   :  |
| 0   1   0   1 | 0 |   :  |
| 0   1   0   0 | 0 |   :  |
| 0   0   1   1 | 0 |   :  |
| 0   0   1   0 | 0 |   :  |
| 0   0   0   1 | 0 | Low |
| 0   0   0   0 | LOSS OF DATA | |
| 1   1   1   1 | 1 | Low |
| 1   1   1   0 | 1 |   :  |
| 1   1   0   1 | 1 |   :  |
| 1   1   0   0 | 1 |   :  |
| 1   0   1   1 | 1 |   :  |
| 1   0   1   0 | 1 |   :  |
| 1   0   0   1 | 1 | High |
| 1   0   0   0 | BLANK | |

DATA RECEPTION APPARATUS AND DATA RECEPTION METHOD

FIELD OF THE INVENTION

This invention relates to a data reception apparatus and a data reception method for use with a communication terminal of a digital portable telephone system, for example.

BACKGROUND OF THE INVENTION

Recently, a CDMA (code division multiple access) system has been available as a wireless connection system for connecting a base station and communication terminals comprising a digital portable telephone system via radio waves.

The CDMA portable telephone system has hitherto been standardized under the title of IS-95 by TIA (Telecommunications Industry Association). According to the standardization of the TIA under the title of IS-95, it is standardized that the CDMA portable telephone system uses a transfer rate (hereinafter referred to as "line transfer rate") of one kind (e.g. approximately 19200 bps) in the wireless interval between the base station and the communication terminal. It is also standardized that, when data is transmitted within the communication terminal of the CDMA portable telephone system, such communication terminal selects a proper data transfer rate corresponding to a line quality, a data quality and the like from a plurality of kinds of data transfer rates (e.g. four kinds of data transfer rates of approximately 9600 bps, approximately 4800 bps, approximately 2400 bps and approximately 1200 bps) comprising line transfer rates of a reciprocal of an integer of the line transfer rate, i.e. 1/n (n is an arbitrary integer) of the line transfer rate and uses such selected data transfer rate.

When the communication terminal of the CDMA portable telephone system intends to transmit data, since data amounts of transmission object data differ at every available data transfer rate, the communication terminal processes transmission object data in the manner different at every data transfer rate so that transmission object data comprising respective data transfer rates may be converted into data the data amounts of which are the same apparently. Then, the communication terminal becomes able to transmit these data at one kind of line transfer rate. Therefore, when the communication terminal receives data transmitted from other communication terminal through the base station, the communication terminal has to process the received data in the manner corresponding to the above-described used data transfer rate.

When the communication terminal transmits data, data is transmitted under the condition that it contains no information indicating contents of transmission processing, such as information of data transfer rate. Therefore, the communication terminal has to process received data in the manner corresponding to all data transfer rates, and assumes the used data transfer rate from data obtained when the communication terminal processes received data. Then, the communication terminal selects data obtained when the communication terminal processes the received data in the manner corresponding to the estimated data transfer rate.

As the reception processing, the communication terminal implements a series of processing such as de-interleaving for rearranging the order of bit data of received data, de-repetition for returning a data amount of data obtained by the de-interleaving to the original data amount, Viterbi-decoding for decoding data obtained after convolutional-coding in the de-repetition and a CRC (cyclic redundancy check) for checking data obtained in the Viterbi-decoding by CRC codes.

When the communication terminal processes received data in the manner corresponding to all of the data transfer rates as described above, if the communication terminal repeats a series of the above-mentioned processing in response to all of the data transfer rates, then all received data should be repeatedly read out from a memory during the communication terminal processes received data in the manner corresponding to each data transfer rate before received data is de-interleaved, for example. As a consequence, a processing speed is lowered and a power consumption is increased unavoidably.

SUMMARY OF THE INVENTION

It is an object of the present invention to provide a data reception apparatus and a data reception method in which a processing speed may be increased and a power consumption may be lowered.

According to the present invention, there is provided a data reception apparatus for receiving data transmitted such that transmitted data of a data amount corresponding to a transfer rate on a communication line or transmitted data of an arbitrary data amount of a plurality of kinds of data amounts corresponding to ½N times (N is an integer larger than 1) is used at every predetermined unit, transmitted data is directly interleaved and transmitted when a data amount of available transmitted data corresponds to a transfer rate on the communication line and each bit of transmitted data is repeated 2N1 times and the transmitted data is interleaved with the same pattern as that of the aforementioned interleaving when the data amount of the available transmitted data becomes corresponding to a transfer rate ½N times the transfer rate on the communication line. This data reception apparatus comprises a de-interleave means for outputting fundamental data of a data amount corresponding to a transfer rate on a communication line by de-interleaving received data at every predetermined unit and a de-repetition means supplied with fundamental data of every predetermined unit and for sequentially outputting data corresponding to a plurality of kinds of data amounts by using the fundamental data at every predetrmined unit.

Initially, the de-repetition means outputs the fundamental data at every predetermined unit as it is. Then, the de-repetition means generates data of a data amount ½ times the data amount of the fundamental data by using the fundamental data and writes the data thus generated in a memory. Until data of a data amount corresponding to a transfer rate ½Nmax–1 times (Nmax is the maximum value of N) the transfer rate on the communication line is outputted, the de-repetition means repeats the steps of reading out data from the memory, outputting the data thus read out, generating data of a data amount ½ times the data amount of the read out data and writing the data thus generated in the memory. Finally, the de-repetition means reads out data of the data amount corresponding to the transfer rate ½Nmax times the transfer rate on the communication line from the memory, and outputs the data thus read out.

In the present invention, received data is stored in a memory within the de-interleave means, and the received data is de-interleaved by controlling the read address of this memory. The data obtained by this de-interleaving has a data amount corresponding to a transfer rate on a communication line, and is supplied to the de-petitition means as fundamental data.

The de-repetition means is operated as follows. Initially, the de-repetition means outputs the fundamental data as it is. Then, the de-repetition means generates data of a data amount ½ times the data amount of the fundamental data by using the fundamental data and writes the data thus generated in a memory. Until data of a data amount corresponding to a transfer rate ½Nmax−1 times the transfer rate on the communication line is outputted, the de-repetition means repeats the steps of reading out data from the memory, outputting the data thus read out, generating data of a data amount ½ times the data amount of the read out data by using the data thus read out and writing the data thus generated in the memory. Finally, the de-repetition means reads out data of the data amount corresponding to the transfer rate ½Nmax times the transfer rate on the communication line from the memory, and outputs the data thus read out.

This de-repetition means sequentially outputs the data corresponding to the data amounts of a plurality of kinds. The above-mentioned transmitted data is data encoded by convolutional codes, for example. The data corresponding to the data amounts of a plurality of kinds sequentially outputted from the de-repetition means is supplied to and decoded by a decoding means, e.g. a Viterbi decoder. Then, a data amount (transfer rate) of transmitted data is estimated from a plurality of decoded data and the like, and decoded data corresponding to the estimated data amount is finally selected and used.

BRIEF DESCRIPTION OF THE DRAWINGS

FIG. 4 is a diagram used to explain the manner in which data is transmitted through the channel CODEC;

FIG. 5 is a diagram showing an example of a pattern in which repetition data are interleaved in the first transmission mode (data transfer rate of 9600 bps);

FIG. 6 is a diagram showing an example of a pattern in which repetition data are interleaved in the second transmission processing mode (data transfer rate of 4800 bps);

FIG. 7 is a diagram showing an example of a pattern in which repetition data are interleaved in the third transmission processing mode (data transfer rate of 2400 bps);

FIG. 8 is a diagram showing an example of a pattern in which repetition data are interleaved in the fourth transmission processing mode (data transfer rate of 1200 bps);

FIG. 10 is a diagram used to explain soft decision data;

FIG. 11 is a block diagram showing a circuit configuration of a de-repetition circuit and the like.

DESCRIPTION OF THE PREFERRED EMBODIMENT

The present invention will be described below with reference to the drawings.

Figure 1:
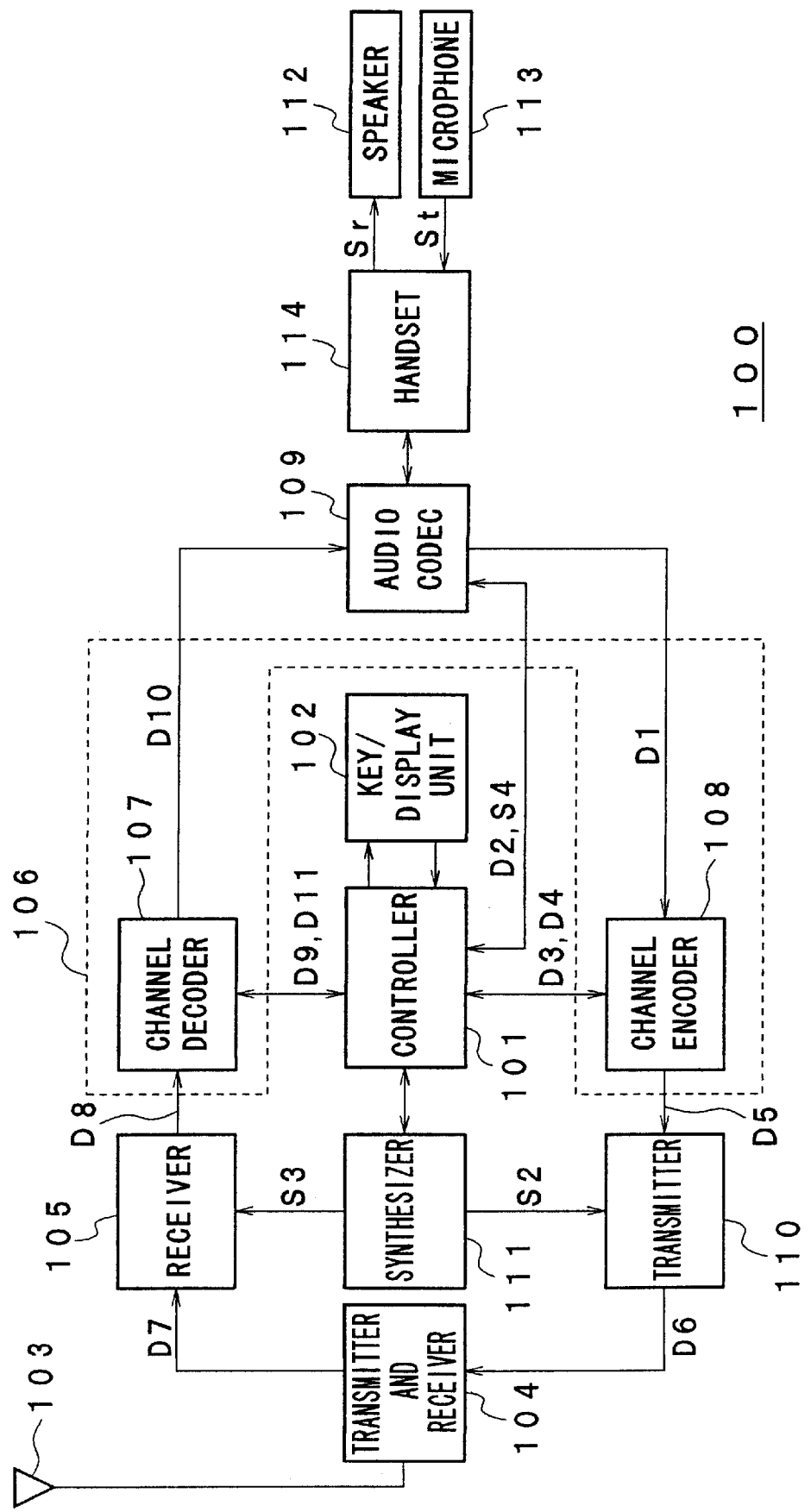
FIG. 1 is a block diagram showing a circuit configuration of a communication terminal according to an embodiment of the present invention.

FIG. 1 of the accompanying drawings shows in block form a communication terminal 100 according to an embodiment of the present invention.

As shown in FIG. 1, this communication terminal 100 includes a controller 101 having a microcomputer to control an operation of the whole of the communication terminal 100. The controller 101 has connected thereto a key/display unit 102 comprising a key unit used by a user to do a variety of key operations and a display unit for displaying the operation state of the apparatus and the like. The controller 101 generates control information, deciphers control information, sets a call, releases a call and holds a call. The controller 101 also executes an I/O(input and output) control of the key/display unit 102.

The communication terminal 100 includes an antenna 103, a transmitter and receiver 104, a receiver 105 for obtaining demodulated data by demodulating a received signal having a predetermined frequency received at the antenna 103, a channel decoder 107 comprising a channel CODEC 106 to convert formats of audio and communication control information and decode the audio and communication control information relative to this demodulated data and an audio CODEC 109 for obtaining a received audio signal by decoding the received audio data outputted from this channel decoder 107 and for obtaining transmitted audio data by encoding a transmitted audio signal from a handset which will be described later on.

Also, the communication terminal 100 includes a channel encoder 108 comprising the channel CODEC 106 to convert formats of the transmitted audio data from the audio CODEC 106 and communication control information from the controller 113 and to encode the above-mentioned transmitted audio data and the above-mentioned communication control information, a transmitter 110 for outputting a transmission signal having a predetermined frequency by modulating the outputted data from this channel encoder 108 and a synthesizer 111 for controlling transmission and reception frequencies under control of the controller 101.

The communication terminal 100 further includes a speaker 112, a microphone 113 and a handset 114 for realizing a speech communication by converting the interface among the speaker 112, the microphone 113 and the audio CODEC 109.

An operation of this communication terminal 100 will be described below. A transmission audio signal St corresponding to user's speech sounds outputted from the microphone 113 is supplied to the audio CODEC 109 through the handset 114. The audio CODEC 109 detects a line quality, a quality of the audio signal St and the like, and sequentially selects one kind of data transfer rate of the audio signal St from four kinds of previously-set data transfer rates of approximately 9600 bps, approximately 4800 bps, approximately 2400 bps and approximately 1200 bps based on the detected result from the audio CODEC 109 and switches a data transfer rate to the data transfer rate thus selected. Then, each time the audio CODEC 109 selects and switches a data transfer rate, the audio CODEC 109 digitizes the audio signal St comprising the data transfer rate thus selected, and transmits audio data D1 thus obtained to the channel encoder 108.

Each time the audio CODEC 109 selects and switches a data transfer rate, the audio CODEC 109 generates speed information data D2 indicative of the data transfer rate thus selected, and supplies this speed information data D2 to the controller 101. The controller 101 generates control data D3 in response to the data transfer rate thus obtained based on the speed information data D2, and transmits the control data D3 thus generated to the channel encoder 108 such that the channel encoder 108 is controlled so as to execute the transmission processing corresponding to the data transfer rates thus sequentially selected. The channel encoder 108 convolutionally encodes the audio data by adding communication control data D4 supplied from the controller 101 to the audio data, converts the audio data thus encoded by convolutional codes into data of a predetermined data format, and then transmits resultant converted data D5 to the transmitter 110.

Since the transmitter 110 is supplied with a control signal S2 for controlling a transmission frequency from the synthesizer 111, the transmitter 1 10 modulates the converted data D5 into data of a predetermined format based on the control signal S2 from the synthesizer 111, and transmits resultant transmission data D6 through the transmitter and receiver 104 and the antenna 103 to a base station (not shown) at a line transfer rate of approximately 19200 bps, for example, in the form of burst data (e.g. one cycle is approximately 20 ms).

Also, at that very moment, the base station (not shown) transmits data, transmitted from other communication terminal (not shown) at a data transfer rate of approximately 9600 bps, approximately 4800 bps, approximately 2400 bps or approximately 1200 bps, similarly to the above-mentioned transmission data D6 at a line transfer rate of approximately 19200 bps in the form of burst data (e.g. one cycle is about 20 ms). The communication terminal 100 receives data (hereinafter referred to as "reception data") D7 transmitted from this base station through the antenna 103 and the transmitter and receiver 104 by the receiver 105.

Since the receiver 105 is supplied with a control signal S3 for controlling the reception frequency from the synthesizer 111, the receiver 105 demodulates the reception data D7 in accordance with a predetermined format based on the control signal S3, and transmits resultant demodulated data D8 to the channel decoder 107. Under control of control data D9 supplied thereto from the controller 101, the channel decoder 107 is operated to decode the received data in the manner corresponding to the data transfer rates while transmitting the demodulated data D8 at all of four kinds of data transfer rates of approximately 9600 bps, approximately 4800 bps, approximately 2400 bps and approximately 1200 bps similar to the data transfer rate.

In this case, the channel decoder 107 converts the demodulated data D8 into data of predetermined formats corresponding to the four kinds of data transfer rates, error-corrects this demodulated data by Viterbi decoding, and thus generates four kinds of decoded data. In addition, the channel decoder 107 assumes a data transfer rate required by the transmission processing relative to the demodulated D8 from a variety of information obtained when the demodulated data D8 are respectively received in response to the four kinds of data transfer rates, and selects decoded data obtained by receiving decoded data from the above-mentioned four kinds of decoded data at the same data transfer rate as the estimated data transfer rate. Then, this channel decoder 107 transmits audio data D10 corresponding to the speech sounds of the party being called comprising the selected decoded data to the audio CODEC 109, and also transmits communication control data D11 comprising the decoded data to the controller 101.

The audio CODEC 109 converts the audio data D10 into analog audio data based on the control signal S4 supplied from the controller 101, interface-converts and transmits a resultant received audio signal Sr through the handset 114 to the speaker 112, whereby speech sounds based on this audio signal Sr are emanated from the speaker 112. In this manner, the communication terminal 100 may generate speech sounds of the party being called from the speaker 112 so that a user may communicate with the party being called through sounds.

The controller 101 generates the communication control data D4 added to the audio data D1 when data is transmitted. When data is received, the controller 101 deciphers the communication control data D11 supplied from the channel decoder 107 thereby to set a call, release a call and holds a call. Also, the controller 101 executes the I/O control of the key/display unit 102, and further controls the synthesizer 111 which controls the transmission frequency and the reception frequency.

The channel encoder 108 will be described next more in detail.

Figure 2:
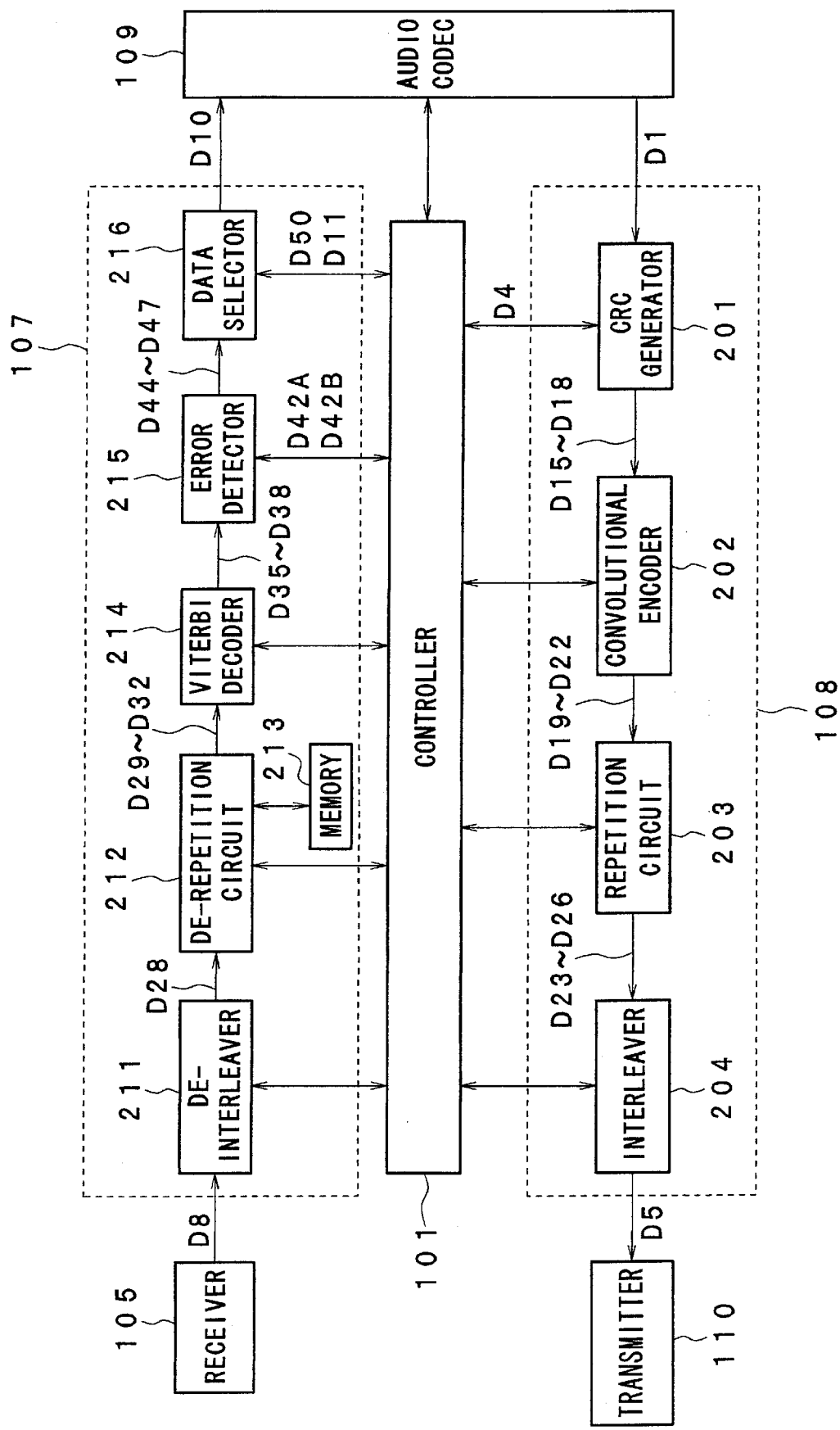
FIG. 2 is a block diagram showing a circuit configuration of a channel CODEC in the communication terminal shown in FIG. 1.
Figure 3:
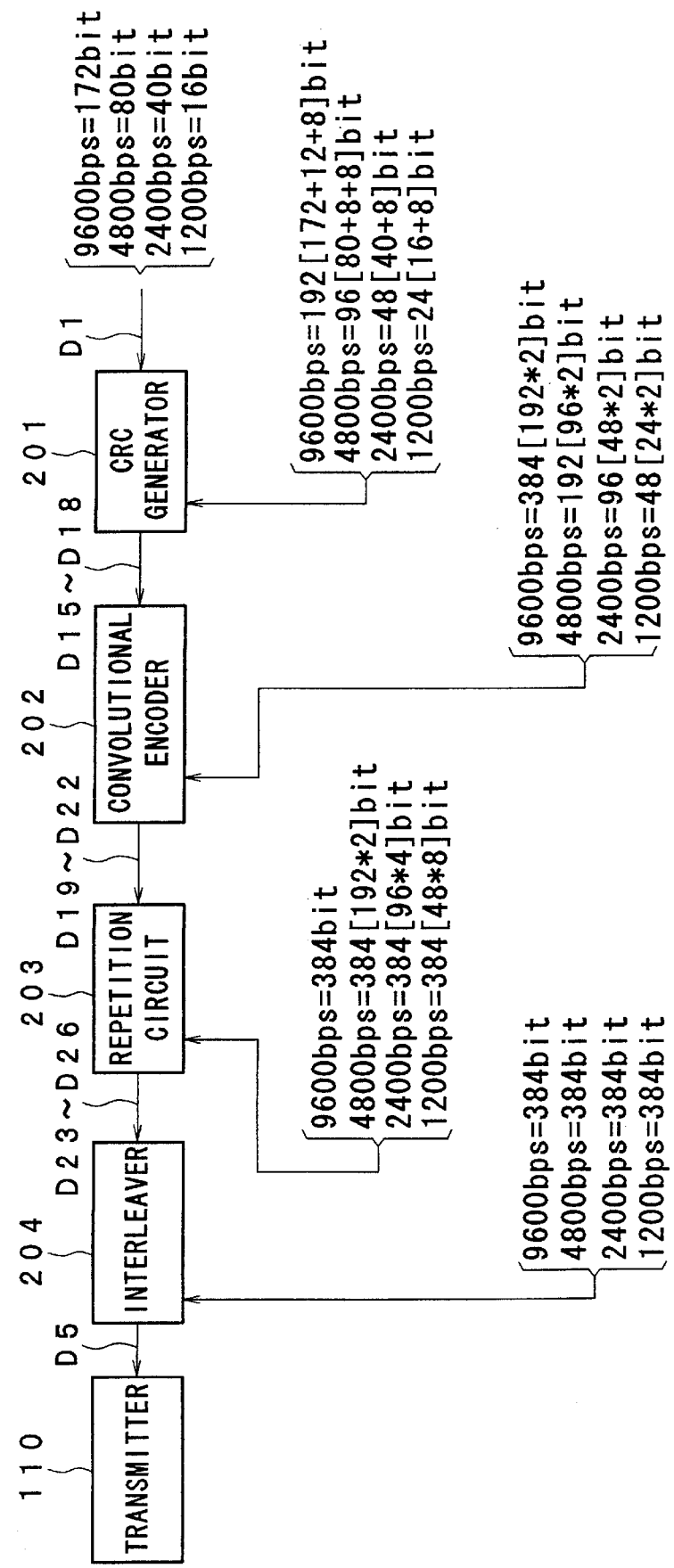
FIG. 3 is a block diagram used to explain the manner in which data is transmitted through the channel CODEC.

As shown in FIGS. 2 and 3, when data is transmitted, if the audio data D1 comprising the data transfer rate of approximately 9600 bps is supplied to the channel encoder 108 from the audio CODEC 109, then the channel encoder 108 is placed in the first transmission processing mode based on the control data D3 supplied from the controller 101 to thereby transmit data in the manner corresponding to the data transfer rate of about 9600 bps. If the audio data D1 comprising the data transfer rate of approximately 4800 bps is supplied to the channel encoder 108 from the audio CODEC 109, then the channel encoder 108 is placed in the second transmission processing mode based on the control data D3 supplied from the controller 101 to thereby transmit data in the manner corresponding to the data transfer rate of approximately 4800 bps.

When data is transmitted, if the audio data D1 comprising the data transfer rate of approximately 2400 bps is supplied to the channel encoder 108 from the audio CODEC 109, then the channel encoder 108 is placed in the third transmission processing mode based on the control data D3 supplied from the controller 101 to thereby transmit data in the manner corresponding to the data transfer rate of approximately 2400 bps. If the audio data D1 comprising the data transfer rate of approximately 1200 bps is supplied to the channel encoder 108 from the audio CODEC 109, then the channel encoder 108 is placed in the fourth transmission processing mode based on the control data D3 supplied from the controller 101 to thereby transmit data in the manner corresponding to the data transrte of approximately the 1200 bps.

As shown in FIG. 2, the channel encoder 108 includes a CRC generator 201 for adding a CRC code used to detect errors to the audio data D1 supplied from the audio CODEC 109, a convolutional encoder 202 for encoding the data outputted from this CRC generator 201 by convolutional codes, a repetition circuit 203 for making a data amount of the data outputted from the convolutional encoder 202 in the first to fourth transmission processing modes become equal to the data amount corresponding to the line transfer rate of approximately 19200 bps and an interleaver 204 for outputting transmission data D5 by interleaving the data outputted from this repetition circuit 203.

An operation of the channel encoder 108 will be described more fully. The audio data D1 outputted from the audio CODEC 109 is supplied to the CRC generator 201. In the first transmission processing mode, the CRC generator 201 generates original data of 172 bits in total by adding the communication control data D4 supplied from the controller 101 to the audio data D1 comprising the data transfer rate of approximately 9600 bps supplied from the audio CODEC 109. Simultaneously, the CRC generator 201 generates a CRC code of 12 bits from the original data thus generated by a polynomial generator G1(X) expressed by the following equation (1), and generates data of 184 bits by adding the code thus generated to the original data. Then, the CRC generator 201 generates code-added-data D15 of 192 bits by adding a tail bit of 8 bits comprising "0" to this data of 184 bits, and transmits the resultant data D15 to the convolutional encoder 202.

$$G1(X)=X^{12}+X^{11}+X^{10}+X^{9}+X^{8}+X^{4}+X+1 \qquad (1)$$

In the second transmission processing mode, the CRC generator 201 generates original data of 80 bits in total by adding the communication control data D4 supplied from the controller 101 to the audio data D1 comprising the data transfer rate of approximately 4800 bps supplied from the audio CODEC 109. Simultaneously, the CRC generator 201 generates a CRC code of 8 bits from the original data thus generated by a polynomial generator G2(X) expressed by the following equation (2), and generates data of 88 bits by adding the code thus generated to the original data. Then, the CRC generator 201 generates code-added-data D16 of 96 bits by adding a tail bit of 8 bits comprising "0" to this data of 88 bits, and transmits the resultant data D16 to the convolutional encoder 202.

$$G2(X)=X^{8}+X^{7}+X^{4}+X^{3}+X+1 \qquad (2)$$

In the third transmission processing mode, the CRC generator 201 generates original data of 40 bits in total by adding the communication control data D4 supplied from the controller 101 to the audio data D1 comprising the data transfer rate of approximately 2400 bps supplied from the audio CODEC 109. Simultaneously, the CRC generator 201 generates code-added-data D17 of 48 bits by adding a tail bit of 8 bits comprising "0" to the original data thus generated, and transmits the resultant data D17 to the convolutional encoder 202.

Further, in the fourth transmission processing mode, the CRC generator 201 generates original data of 16 bits in total by adding the communication control data D4 supplied from the controller 101 to the audio data D1 comprising the data transfer rate of approximately 1200 bps supplied from the audio CODEC 109. Simultaneously, the CRC generator 201 generates code-added-data D18 of 24 bits by adding a tail bit of 8 bits comprising "0" to the original data thus generated, and transmits the resultant data D18 to the convolutional encoder 202.

Each time the code-added-data D15 to D18 are supplied thereto, the convolutional encoder 202 encodes the code-added-data D15 to D18 from the initial value comprising "0" by convolutional codes based on a previously-set constraint length k (set to 9 in the case of this embodiment) and a previously-set encoding rate R (set to ½ in the case of this embodiment), and supplies resultant encoded data D19 to D22 to the repetition circuit 203.

In actual practice, in the first transmission processing mode, this convolutional encoder 202 generates the encoded data D19 of 384 bits from the code-added-data D15 of 192 bits comprising the data transfer rate of approximately 9600 bps. In the second transmission processing mode, this convolutional encoder 202 generates the encoded data D20 of 192 bits from the code-added-data D16 of 96 bits comprising the data transfer rate of approximately 4500 bps. In the third transmission processing mode, this convolutional encoder 202 generates the encoded data D21 of 96 bits from the code-added-data D17 of 48 bits comprising the data transfer rate of approximately 2400 bps. In the fourth transmission processing mode, this convolutional encoder 202 generates the encoded data D22 of 48 bits from the code-added-data D18 of 24 bits comprising the data transfer rate of approximately 1200 bps.

The repetition circuit 203 has the number of repeating data previously set for each of the first to fourth transmission processing modes. In the first transmission processing mode, the repetition circuit 202 does not repeat the encoded data D19 of 384 bits comprising the data transfer rate of approximately 9600 bps but supplies directly the encoded data D19 to the interleaver 204 as repeated data D23. In the second transmission processing mode, the repetition circuit 203 generates repeated data D24 of 384 bits by sequentially repeating data of 1 bit once from the encoded data D20 of 192 bits comprising the data transfer rate of approximately 4800 bps (in this case, the same data continues twice), and transmits the repeated data D24 thus generated to the interleaver 204.

In the third transmission processing mode, the repetition circuit 203 generates repeated data D25 of 184 bits by sequentially repeating data of 1 bit from the encoded data D21 of 96 bits comprising the data transfer rate of approximately 2400 bps three times (in this case, the same data continues four times), and transmits the repeated data D25 thus generated to the interleaver 204. In the fourth transmission processing mode, the repetition circuit 203 generates repeated data D26 of 384 bits by sequentially repeating data of 1 bit from the encoded data D22 of 48 bits comprising the data transfer rate of approximately 1200 bps seven times (in this case, the same data continues 8 times), and transmits the repeated data D26 thus generated to the interleaver 204.

In this manner, the repetition circuit 203 converts the encoded data D20 to D22 comprising the data transfer rates of approximately 4800 bps, approximately 2400 bps and approximately 1200 bps into the repeated data D24 to D26 of apparently the same data length as that of the repeated data D23 of 384 bits comprising the data transfer rate of approximately 9600 bps by repeating the above-mentioned encoded data D20 to D22.

The interleaver 204 interleaves the repeated data D23 to D26 in accordance with an interleave pattern previously set regardless of the first to fourth transmission processing modes, and transmits the resultant converted data D5 of 384 bits to the transmitter 110. FIGS. 5 to 8 are diagrams showing interleave patterns which are used by the interleaver 204 to interleave the repeated data D23 to D26 in the first to fourth transmission processing modes, respectively.

In this case, the repeated data D23 to D26 are interleaved by sequentially reading the symbols of the repeated data D23 to D26 from the memory from left to the longitudinal direction after the symbols of the repeated data D23 to D26 have been written in the memory as illustrated (Nos. in FIGS. 5 to 8 depict the sequential order of the respective bits outputted from the convolutional encoder 202). A de-interleaver 211 in the channel decoder 107, which will be described later on, is adapted to de-interleave the repeated data by randomly reading out 1st to 384th symbols of the repeated data from the memory after symbols of the repeated data have been written in the memory similarly.

As shown in FIG. 4, the transmitter 110 sequentially obtains the transmission data D6 comprising a data amount of one cycle (approximately 20 ms) by modulating the converted data D5 at every 384 bits, and transmits the same transmission data D6 at the line transfer rate of about 19200 bps in the form of burst data.

The channel decoder 107 will be described next more in detail.

Figure 9:
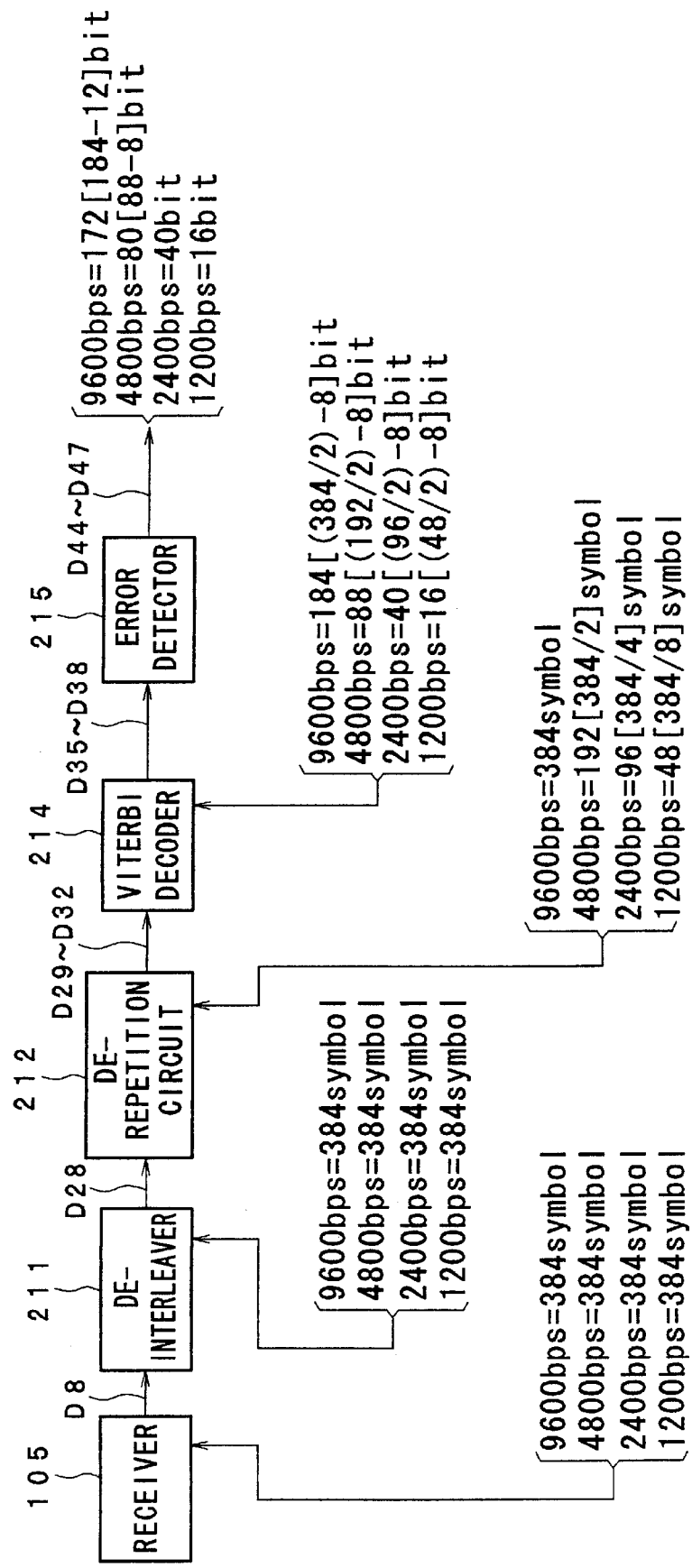
FIG. 9 is a block diagram used to explain the manner in which data is received through the channel CODEC.

As shown in FIGS. 2 and 9, the channel decoder 107 includes a de-interleaver 211 for de-interleaving the demodulated data D8 from the receiver 105 and a de-repetition circuit 212 for sequentially outputting data of 384 symbols comprising the data transfer rate of approximately 9600 bps, data of 192 symbols comprising the data transfer rate of approximately 4800 bps, data of 96 symbols comprising the data transfer rate of approximately 2400 bps and data of 38 symbols comprising the data transfer rate of approximately 1200 bps relative to the data of 384 symbols each from the de-interleaver 211. The de-repetition circuit 212 has connected thereto a memory 213 in which there are stored data useful for executing its processing work.

Also, as shown in FIG. 2, the channel decoder 107 includes a Viterbi decoder 214 for obtaining first to fourth decoded data by decoding four kinds of data outputted from the de-repetition circuit 212 according to the Viterbi algorithm, an error detector 215 for error-correcting the first to fourth decoded data outputted from this Viterbi decoder 214, transmitting error-detected results to the controller 101 and outputting data from which the CRC code was removed and a data selector 216 for selectively outputting any one of the first to fourth data outputted from the error detector 215 and supplying the audio data D10 comprising such data to the audio CODEC 109. The controller 101 assumes a data transfer rate based on the error-detected results of the first to fourth decoded data and data indicative of estimated error rates of the first to fourth decoded data which will be described later on, etc.

An operation of the channel decoder 107 will be described in detail. The demodulated data D8 demodulated at the receiver 105 is supplied to the de-interleaver 211. The receiver 105 outputs each symbol of the demodulated data D8 as soft decision data. As shown in FIG. 10, the soft decision data comprises polarity data (bit3) of 1 bit, for example, and reliability information (bit2, bit1, bit0) of 3 bits. A pattern "0000" in FIG. 10 means data lost (data unavailable). Also, a pattern "1000" in FIG. 10 is made blank in order to maintain a symmetry of data.

Figure 11:
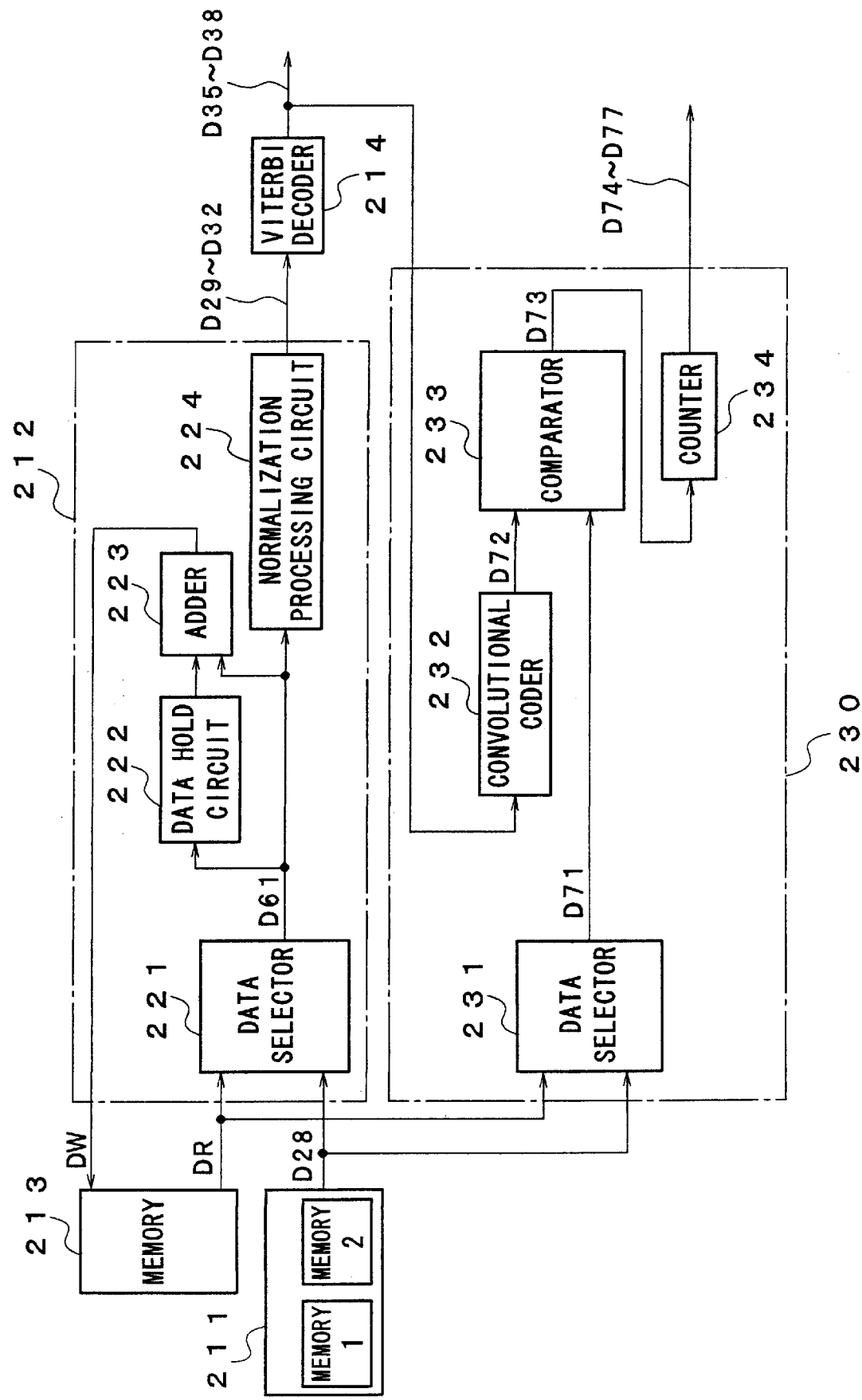

The de-interleaver 211 incorporates therein first and second memory units (not shown in FIGS. 2 and 9 but shown by memories 1, 2 in FIG. 11). The de-interleaver 211 stores the 384 symbols each (data amount of one cycle in the transmission) of the demodulated data D8 in the first and second memory units alternately, reads out the 384 symbols each of the demodulated data D8 from the first and second memory units while de-interleaving the demodulated data. Then, the de-interleaver 211 transmits the resultant 384 symbols each of the data D28 to the de-repetition circuit 212.

The de-repetition circuit 212 sequentially outputs data D29 of 384 symbols comprising the data transfer rate of approximately 9600 bps, data D30 of 192 symbols comprising the data transfer rate of approximately 4800 bps, data D31 of 96 symbols comprising the data transfer rate of approximately 2400 bps and data D32 of 48 symbols comprising the data transfer rate of approximately 1200 bps in response to the data D28 (fundamental data) of 384 symbols each, and transmits the data D29 to D32 to the Viterbi decoder 214.

The Viterbi decoder 214 decodes the data D29 to D32 in a maximum likelihood fashion in which a constraint length k is set to 9 and the encoding rate R is set to ½ by using the Viterbi algorithm, and transmits resultant first to fourth decoded data D35 to D38 (tail bits are removed) to the error detector 215. Specifically, the Viterbi decoder 214 generates first decoded data D35 of 184 bits from the data D29 of 384 bits comprising the data transfer rate of approximately 9600 bps, the Viterbi decoder 214 generates second decoded data D36 of 88 bits from the data D30 of 92 bits comprising the data transfer rate of approximately 4800 bps, the Viterbi decoder 214 generates third decoded data D37 of 40 bits from the data D31 of 96 symbols comprising the data transfer rate of approximately 2400 bps, and further the Viterbi decoder 214 generates fourth decoded data D38 of 16 bits from the data D31 of 48 symbols comprising the data transfer rate of approximately 1200 bps.

The error detector 215 error-detects the first decoded data D35 comprising the data transfer rate of approximately 9600 bps by using the generator polynomial $G1(X)$ expressed by the aforementioned equation (1), and transmits the error-detected result to the controller 101 as error-detected data D42A. Simultaneously, the error detector 215 removes data indicative of a portion to which the CRC code is estimated to be added from the first decoded data D35, and transmits resultant first original data D44 of 172 bits to the data selector 216.

Also, the error detector 215 error-detects the second decoded data D36 comprising the data transfer rate of approximately 4800 bps by using the generator polynomial $G2(X)$ expressed by the aforementioned equation (2), and transmits the error-detected result to the controller 101 as error-detected data D42B. Simultaneously, the error detector 215 removes data indicative of a portion to which the CRC code is estimated to be added from the second decoded data D36, and transmits resultant second original data D45 of 80 bits to the data selector 216.

Further, the error detector 215 transmits the third decoded data D37 comprising the data transfer rate of approximately 2400 bps and the fourth decoded data D38 comprising the data transfer rate of approximately 1200 bps to the data selector 216 as third and fourth original data D46 and D47.

The data selector 216 selects data, obtained by processing data in response to the estimated data transfer rate based on estimated rate data D50 from the controller 101, from the first to fourth original data D44 to D47, and transmits the audio data D10 comprising the selected data to the audio CODEC 109. Simultaneously, the data selector 216 transmits the communication control data D11 to the controller 101.

The de-repetition circuit 212 will be described next more fully with reference to FIG. 11.

As shown in FIG. 11, the de-repetition circuit 212 includes a data selector 221 for selecting the data D28 (fundamental data) of 384 symbols each outputted from the de-interleaver 211 or the data DR read out from the memory 213, a data hold circuit 222 for holding preceding data of two consecutive symbol data comprising data D61 selected by this data selector 221, an adder 223 for adding the preceding data held by this data hold circuit 222 and succeeding data forming a pair with the preceding data and transmitting added data to the memory 213 as write data DW and a normalization processing unit 224 for normalizing a bit rate of the data D61 (soft decision data) selected by the data selector 221 to provide normalized data of 4 bits and outputting the data thus normalized to the Viterbi decoder 214.

Figure 12:
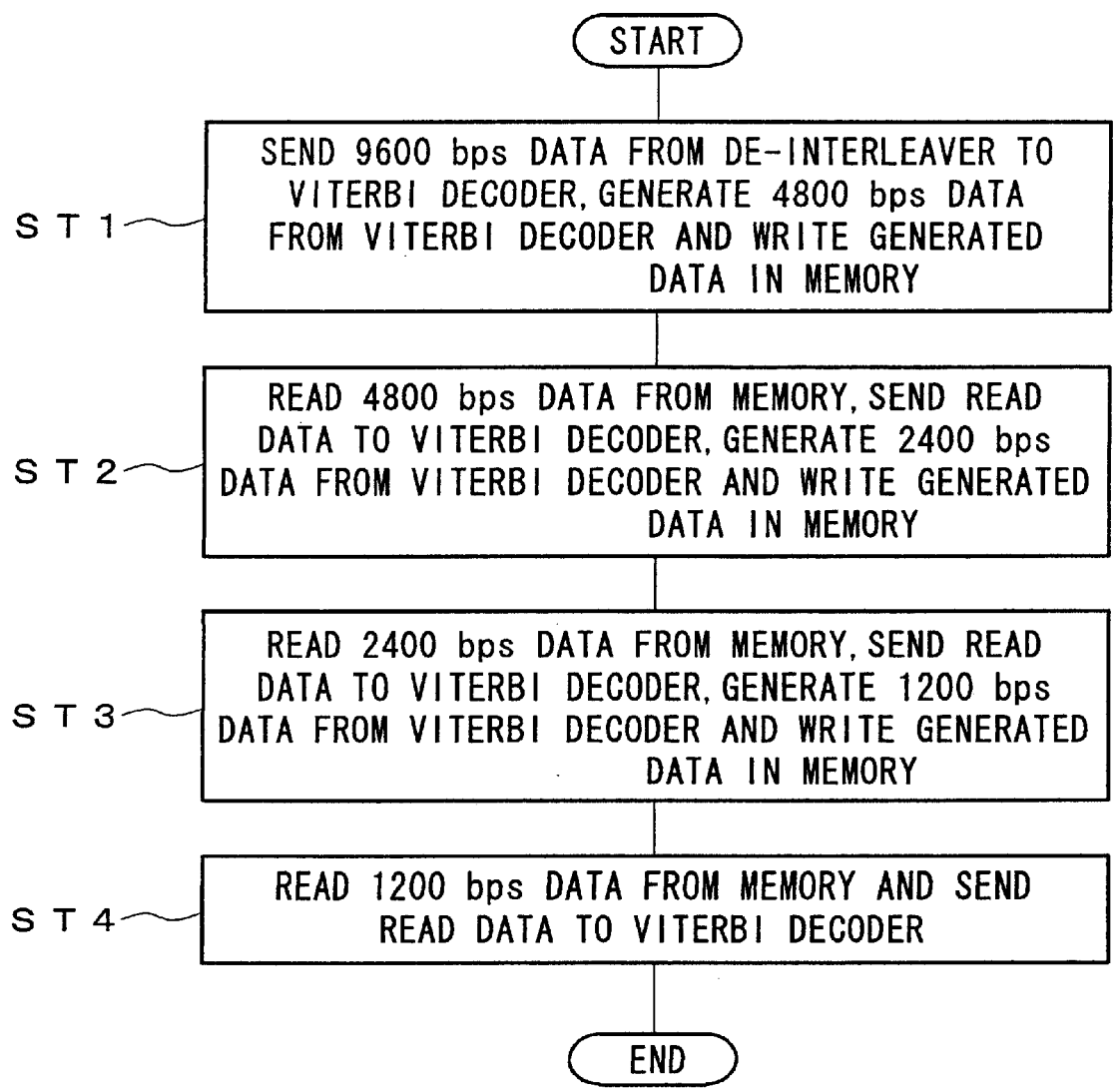
FIG. 12 is a flowchart to which reference will be made in explaining an operation of the de-repetition circuit.

An operation of the de-repetition circuit 212 will be described below in detail with reference to FIG. 11 and a flowchart of FIG. 12. This de-repetition circuit 212 effects the following steps ST1 to ST4 on the data D28 of 384 symbols each outputted from the de-interleaver 211, in that order (see FIG. 12).

Initially, the step ST1 will be described with reference to FIGS. 11 and 12. The data selector 221 selects the data D28 of 384 symbols (soft decision data of 4 bits) outputted from the de-interleaver 211, and transmits the data D61 (data D28) thus selected through the normalization processing unit 224 to the Viterbi decoder 214 as the data D29 of 384 symbols comprising the data transfer rate of approximately 9600 bps. Also, the data hold circuit 222 and the adder 223 are used to sequentially add two consecutive symbol data to the data D61 thus outputted to thereby obtain data of 192 symbols (soft decision data of 5 bits) comprising the data transfer rate of approximately 4800 bps. Then, this data is written in the memory 213 as the write data DW.

The step ST2 will be described next with reference to FIGS. 11 and 12. The data of 192 symbols that was written at the step ST1 is read out from the memory 213. The data selector 221 selects the read data DR from the memory 213. After the normalization processing unit 224 normalizes the bit rate of the data D61 thus selected to provide data of 4 bits, the normalization processing unit 224 transmits the data thus normalized to the Viterbi decoder 214 as the data D30 of 192 symbols comprising the data transfer rate of approximately 4800 bps. Also, the data hold circuit 222 and the adder 223 are used to sequentially add two consecutive symbol data to the outputted data D61 to thereby obtain data of 96 symbols (soft decision data of 6 bits) comprising the data transfer rate of approximately 2400 bps. Then, this data is written in the memory 213 as the write data DW.

The step ST3 will be described next with reference to FIGS. 11 and 12. The data of 96 symbols written at the step ST2 is read out from the memory 213, and the read data DR is selected by the data selector 221. After the normalization processing unit 224 normalizes the bit rate of the outputted data D61 to 4 bits, the normalization processing unit 224 transmits the normalized data to the Viterbi decoder 214 as the data D31 of 96 symbols comprising the data transfer rate of approximately 2400 bps. Also, the data hold circuit 222 and the adder 223 are used to sequentially add two consecutive symbol data to the outputted data D61 to thereby obtain data of 38 symbols (soft decision data of 7 bits). Then, this data is written in the memory 213 as the write data DW.

The step ST4 will be described next with reference to FIGS. 11 and 12. The data of 48 symbols written at the step ST3 is read out from the memory 213, and the read data DR is selected by the data selector 221. After the normalization processing unit 224 normalizes the bit rate of the outputted data D61 to 4 bits, the normalization processing circuit 224 transmits the data thus normalized to the Viterbi decoder 214 as the data D32 of 38 symbols comprising the data transfer rate of approximately 1200 bps.

Since the de-repetition circuit 212 shown in FIG. 11 is used, with respect to each data of 384 symbols each of the received data, it is sufficient that the de-interleaver 211 might read (de-interleave) data of 384 symbols once. Also, with respect to the data comprising the data transfer rates of approximately 4800 bps, 2400 bps and 1200 bps, since the de-repetition processing is ended in advance when data comprising the preceding data transfer rate is processed, the soft decision data required in the Viterbi decoding may be constantly prepared during a constant processing time and at a constant sequence. Thus, the processing speed of the data reception apparatus may be improved and the power consumption of the data reception apparatus may be lowered. Moreover, since the de-repetition processing concerning data comprising the data transfer rates of approximately 4800 bps, approximately 2400 bps and approximately 1200 bps is executed by commonly using the data hold circuit 222 and the adder 223, the circuit-scale of the data reception apparatus may be miniaturized.

The present invention is not limited to the above-mentioned arrangement, and the following variant is also possible. That is, if data of consecutive two symbols are simultaneously outputted from the de-interleaver 211 and the memory 213, then the data hold circuit 222 may be omitted and the de-repetition processing may be executed by only the adder 223.

The data error rate estimation circuit 230 will be described next with reference to FIG. 11.

As shown in FIG. 11, the data error rate estimation circuit 230 includes a data selector 231 for selecting the data D28 of 384 symbols each (fundamental data) outputted from the de-interleaver 211 or the read data DR from the memory 213 and a convolutional encoder 232 for sequentially encoding the first to fourth decoded data D35 to D38 outputted from the Viterbi decoder 214 by convolutional codes. This convolutional encoder 232 encodes data by convolutional codes in the same way as the convolutional encoder 202 in the above-mentioned channel encoder 108 encodes data by the convolutional codes.

As shown in FIG. 11, the data error rate estimation circuit 230 further includes a comparator 233 for comparing data D71 (soft decision data) selected by the data selector 231 and encoded data from the convolutional encoder 232 and a counter 234 for obtaining estimated error rate data respectively correspondi to the first to fourth decoded data D35 to D38 by counting anti-coincidence data outputted from this comparator 233.

An operation of the data error rate estimation circuit 230 will be described below in detail. When the first decoded data D35 is outputted from the Viterbi decoder 214, the convolutional encoder 232 encodes the first decoded data D35 by using the convolutional code, and supplies encoded data D72 of 384 symbols thus obtained to the comparator 233. In synchronism with the supply of the encoded data D72 of 384 symbols to the comparator 233, the de-interleaver 211 outputs the data D28 of 384 symbols (soft decision data) which is the data obtained before the first decoded data D35 is decoded, and supplies this data D28 to the comparator 233 as the data D71.

The comparator 233 compares polarity information bits of the data D72 and the data D71 (D28) symbol by symbol. Each time the comparator 233 obtains a compared result indicating that the polarity information bits of the data D72 and the data D71 are not coincident, the comparator 233 supplies anti-coincidence data D73 indicating such anti-coincidence to,the counter 234. The counter 234 counts each anti-coincidence data D73. When the comparator 233 ends the comparison of data of 384 symbols, the counter 234 supplies the counted value obtained at that moment (estimated error rate of errors occurred in the first decoded data D35) to the controller 101 as estimated error rate data D74.

When the second decoded data D36 is outputted from the Viterbi decoder 214, the convolutional encoder 232 encodes the second decoded data D36 by the convolutional code, and supplies the resultant encoded data D72 of 192 symbols to the comparator 233. Also, in synchronism with the supply of the encoded data D72 of 192 symbols to the comparator 233, the data DR of 192 symbols (soft decision data) which is the data obtained before the second decoded data D36 is decoded is obtained from the memory 213. This data DR is selected by the data selector 231, and the selected data is supplied from the data selector 231 to the comparator 233 as the data D71.

The comparator 233 compares polarity information bits of the data D72 and the data D71 (data DR) symbol by symbol. Each time the comparator 233 obtains a compared result indicating that the data D72 and the data D71 are not coincident, the comparator 233 supplies the anti-coincidence data D73 indicating such anti-coincidence to the counter 234. The counter 234 counts each anti-coincidence data D73. When the comparator 233 ends the comparison of data of 192 symbols, the counter 234 supplies the counted value obtained at that moment (estimated error rate of errors occurred in the second decoded data D36) to the controller 101 as estimated error rate data D75.

When the Viterbi decoder 214 outputs the third and fourth decoded data D37, D38, similarly to the case wherein the above-mentioned Viterbi decoder 214 outputs the second decoded data D36, the counter 234 supplies the counted values indicative of the estimated error rates of errors that occurred in the third and fourth decoded data D37, D38 to the controller 101 as estimated error rate data D76, D77.

Since the data error rate estimation circuit 230 is arranged as shown in FIG. 11, it is possible to effectively utilize data that are sequentially written in the memory 213 after they have been processed by the de-repetition circuit 212.

While the transmission data are the encoded data D19 to D22 which are encoded by the convolutional codes as described above, the transmission data are not limited to the above-mentioned encoded data and may be other encoded data. Alternatively, the present invention may be similarly applied to the case in which transmission data is data which is not encoded.

According to the present invention, since the data reception apparatus and the data reception method receive data transmitted such that transmitted data of a data amount corresponding to a transfer rate on a communication line or transmitted data of an arbitrary data amount of a plurality of kinds of data amounts corresponding to ½N times (N is an integer larger than 1) is used, at every predetermined unit, the transmitted data is processed so as to have a data amount corresponding to the transfer rate on the communication line and the transmitted data is also interleaved and in which fundamental data of a data amount corresponding to the transfer rate on the communication line is obtained by de-interleaving received data at every predetermined unit and data corresponding to the plurality of kinds of data amounts are obtained by using this fundamental data, when data corresponding to the plurality of kinds of data amounts are obtained, it is sufficient that received data might be de-interleaved only once. Therefore, the processing speed of the data reception apparatus and the data reception method may be increased, and the power consumption of the data reception apparatus and the data reception method may be lowered.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A data reception apparatus for receiving data transmitted such that transmitted data of a data amount corresponding to a transfer rate on a communication line or transmitted data of an arbitrary data amount of a plurality of kinds of data amounts corresponding to ½N times (N is an integer larger than 1) is used at every predetermined unit, said transmitted data is directly interleaved and transmitted when said data amount of available transmitted data corresponds to said transfer rate on said communication line and each bit of said transmitted data is repeated 2N−1 times and said transmitted data is interleaved with a same pattern as that of the aforementioned interleaving when said data amount of said available transmitted data corresponds to said transfer rate ½N times said transfer rate on said communication line, said data reception apparatus comprising:

de-interleave means for outputting fundamental data of said data amount corresponding to said transfer rate on said communication line by de-interleaving received data at every predetermined unit; and de-repetition means supplied with said fundamental data of every predetermined unit and for sequentially outputting data corresponding to said plurality of kinds of data amounts by using the fundamental data at every predetermined unit, wherein said de-repetition means outputs said fundamental data at every predetermined unit as it is, generates data of said data amount ½ times the data amount of the fundamental data by using said fundamental data and writes the data generated in a memory, until data of said data amount corresponding to a transfer rate ½Nmax-1 times (Nmax is the maximum value of N) the transfer rate on said communication line is outputted, said de-repetition means repeats steps of reading out data from said memory, outputting said data read out, generating data of said data amount ½ times said data amount of said read out data and writing said data generated in said memory and said de-repetition means reads out data of said data amount corresponding to the transfer rate ½Nmax times the transfer rate on said communication line from said memory, and outputs said data read out.

2. The data reception apparatus as claimed in claim 1, wherein said de-repetition means includes a data selector for selecting either said fundamental data outputted from said de-interleave means or the data read out from said memory, data output means for outputting data selected by said data selector as outputted data, data generation means for generating data whose data amount becomes ½ by sequentially adding consecutive 2 bits of the data selected by said data selector, data write means for writing data generated by said generation means in said memory and data read means for reading out data from said memory and supplying the data read out to said data selector.

3. The data reception apparatus as claimed in claim 1, wherein said transmitted data is encoded data and said data reception apparatus further includes decoding means for decoding data whose data amount corresponds to said plurality of kinds of data amounts sequentially outputted from said de-petitition means.

4. The data reception apparatus as claimed in claim 3, wherein said encoded data is data encoded by convolutional codes after a tail bit was added to a transmission object data.

5. The data reception apparatus according to claim 3, further comprising a data selector for selecting either said fundamental data outputted from said de-interleave means or said data read out from said memory, encoding means for encoding again data decoded by said decoding means and comparing means for detecting errors of symbols from said encoded data by comparing said encoded data from said encoding means and data outputted from said data selector and wherein said data selector selects said fundamental data when said fundamental data is supplied to said decoding means and said data selector selects data read out from said memory when said data read out from said memory is supplied to said decoding means.

6. A data reception method for receiving data transmitted wherein transmitted data of a data amount corresponding to a transfer rate on a communication line or said transmitted data of an arbitrary data amount of a plurality of kinds of data amounts corresponding to $\frac{1}{2}N$ times (N is an integer larger than 1) is used at every predetermined unit, said transmitted data is directly interleaved and transmitted when said data amount of available transmitted data corresponds to said transfer rate on said communication line and each bit of said transmitted data is repeated $2N-1$ times and said transmitted data is interleaved with a same pattern as that of the aforementioned interleaving when said data amount of said available transmitted data corresponds to a transfer rate $\frac{1}{2}N$ times said transfer rate on said communication line, said data reception method comprising:

- a first step of outputting fundamental data of said data amount corresponding to a transfer rate on said communication line by de-interleaving received data at every predetermined unit; and
- a second step supplied with said fundamental data of every predetermined unit and for sequentially outputting data corresponding to said plurality of kinds of data amounts by using said fundamental data at every predetermined unit, wherein said second step outputs said fundamental data at every predetermined unit as it is, generates data of a data amount $\frac{1}{2}$ times said data amount of said fundamental data by using said fundamental data and writes said data thus generated in a memory, until data of said data amount corresponds to a transfer rate $\frac{1}{2}Nmax-1$ times (Nmax is the maximum value of N) said transfer rate on said communication line is outputted, said second step repeats the steps of reading out data from said memory, outputting said data read out, generating data of said data amount $\frac{1}{2}$ times said data amount of said read out data and writing said data generated in said memory and said second step reads out data of said data amount corresponding to a transfer rate $\frac{1}{2}Nmax$ times said transfer rate on said communication line from said memory, and outputs said data read out.

* * * * *